United States Patent
Biskeborn et al.

(10) Patent No.: US 9,343,097 B2
(45) Date of Patent: May 17, 2016

(54) METHOD OF FORMING MAGNETIC RECORDING HEAD HAVING PROTECTED READER SENSORS AND NEAR ZERO RECESSION WRITER POLES

(71) Applicant: International Business Machines Corporation, Armonk, NY (US)

(72) Inventors: Robert G. Biskeborn, Hollister, CA (US); W. Stanley Czarnecki, Palo Alto, CA (US); Philipp Herget, San Jose, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 13/781,460

(22) Filed: Feb. 28, 2013

(65) Prior Publication Data
US 2014/0059842 A1    Mar. 6, 2014

Related U.S. Application Data

(63) Continuation of application No. 13/601,068, filed on Aug. 31, 2012, now Pat. No. 9,036,297.

(51) Int. Cl.
  *G11B 5/127*  (2006.01)
  *H04R 31/00*  (2006.01)
  *G11B 5/84*  (2006.01)
  (Continued)

(52) U.S. Cl.
  CPC .............. *G11B 5/84* (2013.01); *G11B 5/00821* (2013.01); *G11B 5/3106* (2013.01); *Y10T 29/49021* (2015.01)

(58) Field of Classification Search
  CPC ............ G11B 5/3967; Y10T 29/49041; Y10T 428/11; Y10T 29/49021; Y10T 29/49032
  USPC .............. 29/603.01, 603.07, 603.11, 603.16; 360/121, 122, 231, 234.7, 235.7, 360/237.1, 315
  See application file for complete search history.

(56) References Cited

U.S. PATENT DOCUMENTS

| 4,309,225 A | 1/1982 | Fan et al. |
| 4,409,633 A | 10/1983 | Watanabe et al. |
| 4,567,493 A | 1/1986 | Ikeda et al. |

(Continued)

FOREIGN PATENT DOCUMENTS

CN    1168734 A    12/1997

OTHER PUBLICATIONS

Non-Final Office Action from U.S. Appl. No. 13/624,484 dated Oct. 15, 2013.

(Continued)

*Primary Examiner* — Thiem Phan
(74) *Attorney, Agent, or Firm* — Zilka-Kotab, PC

(57) ABSTRACT

A method according to one embodiment includes applying a coating to a media facing side of a module, the module having first and second transducers of different magnetic transducer types positioned towards the media facing side of the module, wherein the different transducer types are selected from a group consisting of data reader transducers, servo reader transducers, write transducers, piggyback read-write transducers and merged read-write transducers; wherein the coating forms at least a portion of a first protection structure for protecting the first transducer; and wherein the second transducer has either no protection or is protected by a second protection structure that is different than the first protection structure.

19 Claims, 11 Drawing Sheets

(51) Int. Cl.
*G11B 5/008* (2006.01)
*G11B 5/31* (2006.01)

(56) References Cited

U.S. PATENT DOCUMENTS

| | | | |
|---|---|---|---|
| 4,659,606 A | 4/1987 | Wada et al. | |
| 4,745,509 A | 5/1988 | Watanabe et al. | |
| 4,797,767 A | 1/1989 | Baus, Jr. | |
| 4,822,752 A | 4/1989 | Sugahara et al. | |
| 4,874,716 A | 10/1989 | Rao | |
| 4,975,791 A | 12/1990 | Eggebeen | |
| 5,034,838 A | 7/1991 | Brock et al. | |
| 5,062,021 A | 10/1991 | Ranjan et al. | |
| 5,074,971 A | 12/1991 | Tsuya et al. | |
| 5,165,981 A | 11/1992 | Yamakawa et al. | |
| 5,209,837 A | 5/1993 | Tsuya et al. | |
| 5,211,803 A | 5/1993 | Johnson et al. | |
| 5,264,981 A | 11/1993 | Campbell et al. | |
| 5,323,282 A | 6/1994 | Kanai et al. | |
| 5,381,385 A | 1/1995 | Greenstein | |
| 5,426,550 A | 6/1995 | Mizoh et al. | |
| 5,434,826 A | 7/1995 | Ravipati et al. | |
| 5,572,391 A | 11/1996 | Ishiwata | |
| 5,654,850 A | 8/1997 | Ganapathi et al. | |
| 5,713,122 A | 2/1998 | Aboaf et al. | |
| 5,781,376 A | 7/1998 | Tsukamoto | |
| 5,822,153 A | 10/1998 | Lairson et al. | |
| 5,831,792 A | 11/1998 | Ananth | |
| 5,906,884 A | 5/1999 | Yahisa et al. | |
| 5,909,340 A | 6/1999 | Lairson et al. | |
| 6,043,496 A | 3/2000 | Tennant | |
| 6,157,078 A | 12/2000 | Lansford | |
| 6,172,858 B1 | 1/2001 | Yoda et al. | |
| 6,188,543 B1 | 2/2001 | Terunuma et al. | |
| 6,243,939 B1 | 6/2001 | Chen et al. | |
| 6,258,608 B1 | 7/2001 | Jung | |
| 6,361,837 B2 | 3/2002 | Pangrle et al. | |
| 6,365,286 B1 | 4/2002 | Inomata et al. | |
| 6,416,839 B1 | 7/2002 | Xuan et al. | |
| 6,541,065 B1 | 4/2003 | Sasaki et al. | |
| 6,580,586 B1 | 6/2003 | Biskeborn | |
| 6,639,753 B1 | 10/2003 | Henze et al. | |
| 6,650,469 B2 | 11/2003 | Kim et al. | |
| 6,690,542 B1 | 2/2004 | Wang | |
| 6,757,143 B2 | 6/2004 | Tunayama et al. | |
| 6,759,081 B2 | 7/2004 | Huganen et al. | |
| 6,813,122 B1 | 11/2004 | Granstrom | |
| 6,822,831 B2 | 11/2004 | Ikeda et al. | |
| 6,846,434 B2 | 1/2005 | Askelrod | |
| 6,849,305 B2 | 2/2005 | Bravo-Vasquez et al. | |
| 6,937,435 B2 | 8/2005 | Saliba | |
| 7,023,658 B1 | 4/2006 | Knapp et al. | |
| 7,055,010 B2 | 5/2006 | Lin et al. | |
| 7,072,916 B1 | 7/2006 | Lewis et al. | |
| 7,085,151 B2 | 8/2006 | Ashton et al. | |
| 7,182,877 B2 | 2/2007 | Murai et al. | |
| 7,225,210 B2 | 5/2007 | Guthrie, II | |
| 7,274,528 B2 | 9/2007 | Hamming et al. | |
| 7,281,317 B2 | 10/2007 | Ohno et al. | |
| 7,325,296 B2 | 2/2008 | Biskeborn | |
| 7,469,465 B2 | 12/2008 | Ding et al. | |
| 7,580,227 B2 | 8/2009 | Sato et al. | |
| 7,606,844 B2 | 10/2009 | Kottomtharayil | |
| 7,676,514 B2 | 3/2010 | Faibish et al. | |
| 7,676,904 B2 | 3/2010 | Chau et al. | |
| 7,760,465 B2 | 7/2010 | Koeppe | |
| 7,870,356 B1 | 1/2011 | Veeraswamy et al. | |
| 7,872,833 B2 | 1/2011 | Hu et al. | |
| 7,916,424 B2 | 3/2011 | Biskeborn | |
| 7,925,622 B2 | 4/2011 | Chapman | |
| 8,035,929 B2 * | 10/2011 | Kawakita | G11B 5/29 360/315 |
| 8,526,137 B2 | 9/2013 | Biskeborn et al. | |
| 8,611,043 B2 | 12/2013 | Biskeborn et al. | |
| 8,611,044 B2 | 12/2013 | Biskeborn et al. | |
| 8,780,496 B2 | 7/2014 | Biskeborn et al. | |
| 8,837,082 B2 | 9/2014 | Biskeborn et al. | |
| 8,861,132 B2 | 10/2014 | Biskeborn et al. | |
| 9,036,297 B2 | 5/2015 | Biskeborn et al. | |
| 9,053,723 B2 | 6/2015 | Biskeborn et al. | |
| 2001/0019464 A1 | 9/2001 | Poorman et al. | |
| 2002/0018920 A1 | 2/2002 | Yamamoto et al. | |
| 2002/0098381 A1 | 7/2002 | Coffey et al. | |
| 2002/0141112 A1 | 10/2002 | Saliba | |
| 2003/0227716 A1 | 12/2003 | Yamakura et al. | |
| 2004/0032696 A1 | 2/2004 | Johnson et al. | |
| 2004/0084408 A1 | 5/2004 | Makarov et al. | |
| 2005/0110004 A1 | 5/2005 | Parkin et al. | |
| 2006/0078683 A1 | 4/2006 | Mukai | |
| 2007/0009717 A1 | 1/2007 | Wong | |
| 2007/0097560 A1 | 5/2007 | Karr et al. | |
| 2007/0109686 A1 | 5/2007 | Jose et al. | |
| 2008/0160727 A1 | 7/2008 | Yeo et al. | |
| 2008/0259494 A1 | 10/2008 | Biskeborn | |
| 2008/0259499 A1 | 10/2008 | Hu et al. | |
| 2008/0266711 A1 | 10/2008 | Nibarger et al. | |
| 2008/0278854 A1 | 11/2008 | Biskeborn | |
| 2009/0052093 A1 | 2/2009 | Kawakita et al. | |
| 2009/0244772 A1 | 10/2009 | Sue et al. | |
| 2009/0268343 A1 | 10/2009 | Biskeborn et al. | |
| 2010/0007976 A1 | 1/2010 | Baumgart et al. | |
| 2010/0053817 A1 | 3/2010 | Biskeborn et al. | |
| 2010/0149685 A1 | 6/2010 | Yari et al. | |
| 2010/0246066 A1 | 9/2010 | Kasamatsu et al. | |
| 2010/0269565 A1 | 10/2010 | Biskeborn et al. | |
| 2011/0056825 A1 | 3/2011 | Baubet et al. | |
| 2011/0090589 A1 | 4/2011 | Biskeborn et al. | |
| 2011/0102947 A1 | 5/2011 | Ogawa et al. | |
| 2012/0008234 A1 | 1/2012 | Biskeborn et al. | |
| 2012/0307396 A1 | 12/2012 | Biskeborn et al. | |
| 2012/0307397 A1 | 12/2012 | Biskeborn et al. | |
| 2012/0313591 A1 | 12/2012 | Brambilla et al. | |
| 2013/0286500 A1 | 10/2013 | Biskeborn et al. | |
| 2014/0063645 A1 | 3/2014 | Biskeborn et al. | |
| 2014/0085748 A1 | 3/2014 | Biskeborn et al. | |
| 2014/0087089 A1 | 3/2014 | Biskeborn et al. | |
| 2014/0327986 A1 | 11/2014 | Biskeborn et al. | |
| 2015/0235662 A1 | 8/2015 | Biskeborn et al. | |

OTHER PUBLICATIONS

Supplemental Notice of Allowability from U.S. Appl. No. 13/601,068, dated Mar. 4, 2015.
Restriction/Election Requirement from U.S. Appl. No. 14/703,832, dated Jul. 6, 2015.
Biskeborn et al., U.S. Appl. No. 14/703,832, filed May 4, 2015.
Final Office Action from U.S. Appl. No. 13/624,466, dated May 18, 2015.
Murray et al., "Electron beam induced crystallization of sputter deposited amorphous alumina thin films," Materials Letters 74, 2012, pp. 12-15.
U.S. Appl. No. 13/624,484, filed Sep. 21, 2012.
U.S. Appl. No. 13/601,068, filed Aug. 31, 2012.
U.S. Appl. No. 13/457,916, filed Apr. 27, 2012.
U.S. Appl. No. 13/624,466, filed Sep. 21, 2012.
Edwards et al., "Flex vol. Flexible, Efficient File Volume Virtualization in WAFL," USENIX '08, 2008 USENIX Annual Technical Conference, pp. 129-142.
Sapuntzakis et al., "Optimizing the Migration of Virtual Computers," Proceedings of the 5th Symposium on Operating Systems Design and Implementation, 2002, pp. 1-14.
Meyer et al., "Parallax: Virtual Disks for Virtual Machines," 2008 ACM, EuroSys '08, Apr. 1-4, 2008, Glasgow, Scotland, UK, pp. 1-14.
Non-Final Office Action from U.S. Appl. No. 13/624,466, dated Dec. 31, 2014.
Notice of Allowance from U.S. Appl. No. 13/601,068, dated Jan. 12, 2015.
Notice of Allowance from U.S. Appl. No. 14/334,518, dated Feb. 4, 2015.
Notice of Allowance and Fee(s) Due from U.S. Appl. No. 13/457,916 dated May 12, 2014.

(56) References Cited

OTHER PUBLICATIONS

Final Office Action from U.S. Appl. No. 13/457,916 dated Dec. 3, 2013.
Restriction/Election Requirement from U.S. Appl. No. 13/601,068 dated Jan. 8, 2014.
Non-Final Office Action from U.S. Appl. No. 13/601,068 dated Mar. 6, 2014.
Notice of Allowance and Fee(s) Due from U.S. Appl. No. 13/624,484 dated Mar. 6, 2014.
Final Office Action from U.S. Appl. No. 13/457,916 dated Mar. 20, 2014.
Non-Final Office Action from U.S. Appl. No. 14/334,518, dated Oct. 16, 2014.
U.S. Appl. No. 13/152,253, filed Jun. 2, 2011.
U.S. Appl. No. 14/334,518, filed Jul. 17, 2014.
Final Office Action from U.S. Appl. No. 13/601,068 dated Sep. 18, 2014.
Non-Final Office Action from U.S. Appl. No. 13/624,466 dated Aug. 14, 2014.
Restriction/Election Requirement from U.S. Appl. No. 13/624,484 dated Aug. 19, 2013.
Non-Final Office Action from U.S. Appl. No. 13/457,916 dated May 24, 2013.
Non-Final Office Action from U.S. Appl. No. 13/152,253 dated Mar. 28, 2013.
Notice of Allowance and Fee(s) Due from U.S. Appl. No. 13/152,253 dated Jul. 25, 2013.
Non-Final Office Action from U.S. Appl. No. 13/624,466, dated Jul. 23, 2015.
Non-Final Office Action from U.S. Appl. No. 14/703,832, dated Sep. 25, 2015.
Final Office Action from U.S. Appl. No. 13/624,466, dated Nov. 20, 2015.
Final Office Action from U.S. Appl. No. 14/703,832, dated Mar. 31, 2016.

\* cited by examiner

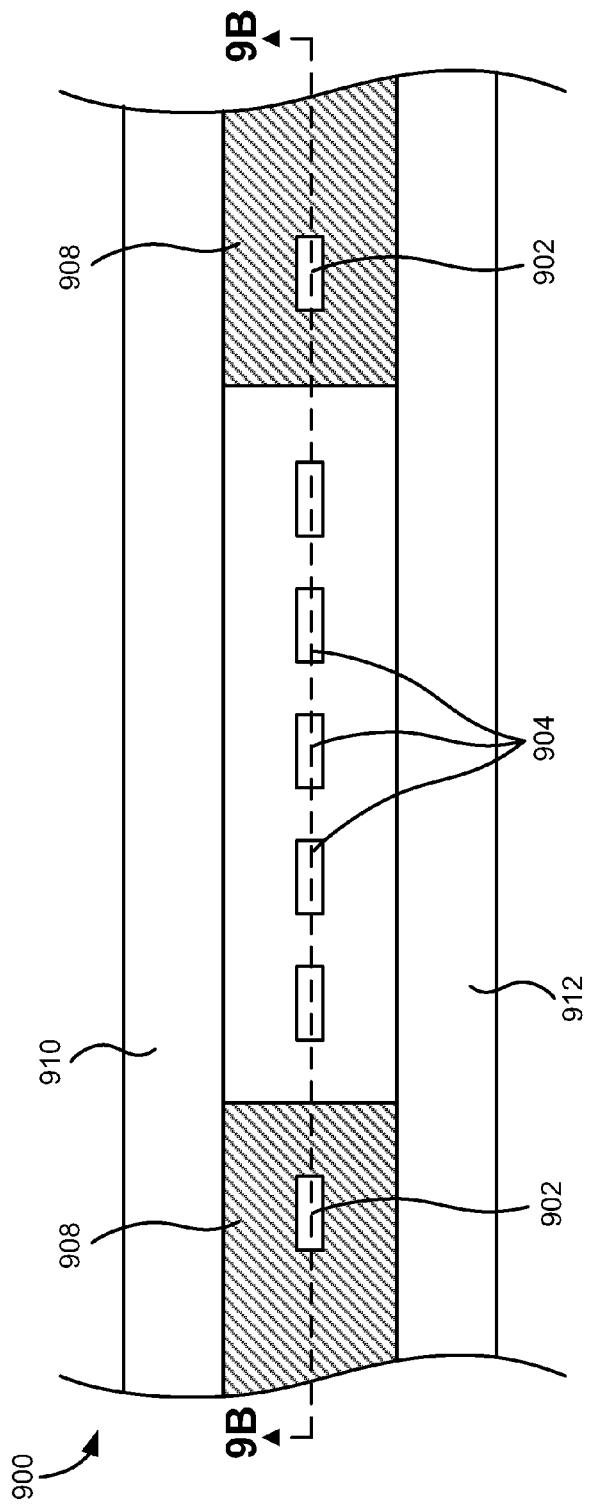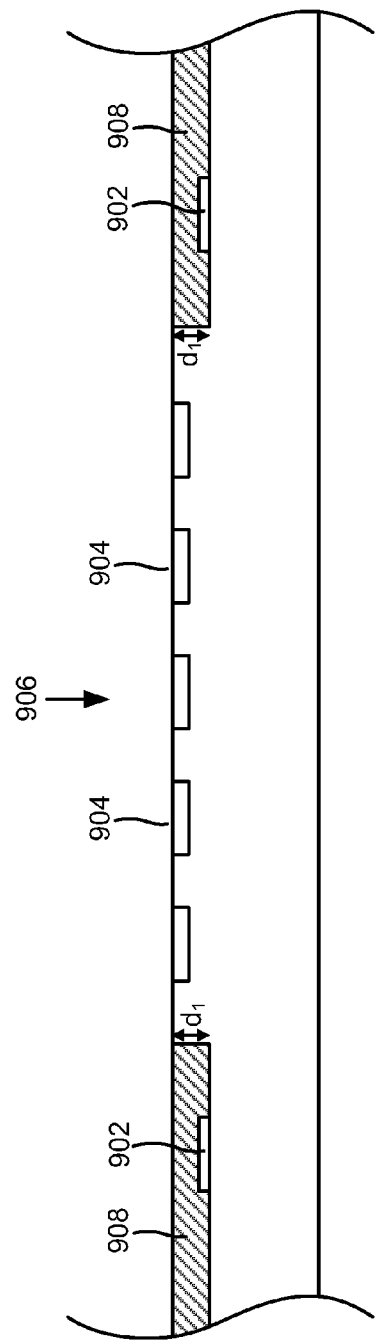

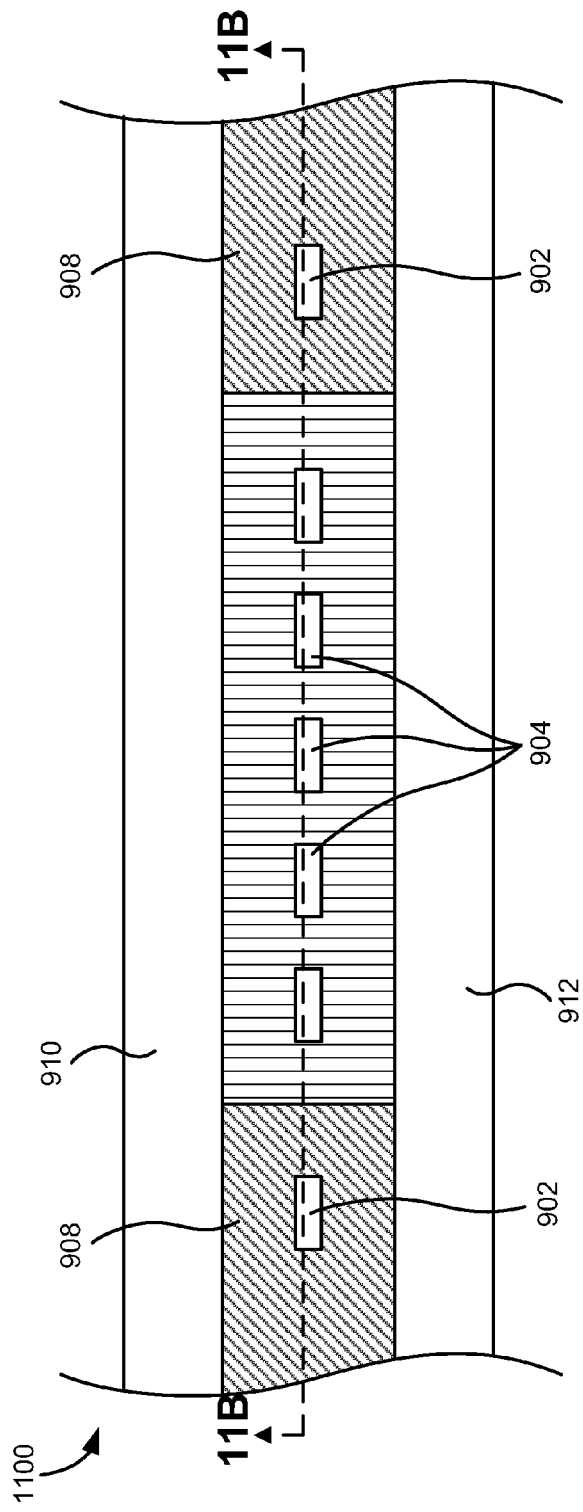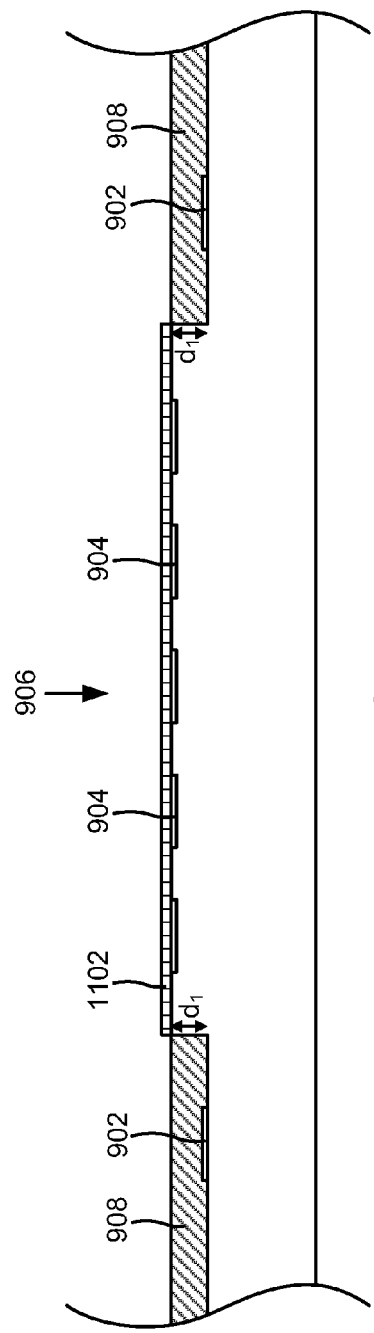
FIG. 11A
FIG. 11B

METHOD OF FORMING MAGNETIC RECORDING HEAD HAVING PROTECTED READER SENSORS AND NEAR ZERO RECESSION WRITER POLES

RELATED APPLICATIONS

This application is a continuation of copending U.S. patent application Ser. No. 13/601,068, filed Aug. 31, 2012; which is herein incorporated by reference.

BACKGROUND

The present invention relates to magnetic heads, and more particularly, this invention relates to methods of forming magnetic heads having modules with differing protection mechanisms for differing transducer types.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

BRIEF SUMMARY

A method according to one embodiment includes applying a coating to a media facing side of a module, the module having first and second transducers of different magnetic transducer types positioned towards the media facing side of the module, wherein the different transducer types are selected from a group consisting of data reader transducers, servo reader transducers, write transducers, piggyback read-write transducers and merged read-write transducers; wherein the coating forms at least a portion of a first protection structure for protecting the first transducer; and wherein the second transducer has either no protection or is protected by a second protection structure that is different than the first protection structure.

A method according to another embodiment includes recessing a portion of a media facing side of a module, the module having first and second transducers of different magnetic transducer types positioned towards the media facing side of the module, wherein the different transducer types are selected from a group consisting of data reader transducers, servo reader transducers, write transducers, piggyback read-write transducers and merged read-write transducers; wherein the recess is positioned towards one of the first transducers, wherein the recess forms a first protection structure for protecting the first transducer; and wherein the second transducer has either no protection or is protected by a second protection structure that is different than the first protection structure.

Any of these embodiments may be implemented in conjunction with a magnetic data storage system such as a tape drive system, which may include a magnetic head (having a module), a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 9A is a partial top-down view of a module according to one embodiment.

FIG. 9B is a partial cross-sectional view of a module according to one embodiment.

FIG. 11A is a partial top-down view of a module according to one embodiment.

FIG. 11B is a partial cross-sectional view of a module according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a magnetic head includes a module, the module having first and second transducers of different transducer types positioned towards a media facing side of the module, wherein the different transducer types are selected from a group consisting of data reader transducers, servo reader transducers, write transducers, piggyback read-write transducers and merged read-write transducers; a first protection structure for protecting the first transducer; and wherein the second transducer has either no protection or is protected by a second protection structure that is different than the first protection structure.

In another general embodiment, a module includes an array of transducers extending along a media facing side, the array of transducers including at least one first transducer and several second transducers, the first and second transducers being of different transducer types, wherein the different transducer types are selected from a group consisting of data reader transducers, servo reader transducers, write transducers, piggyback read-write transducers and merged read-write transducers; a first protection structure for protecting the at least one first transducer; and wherein the second transducers have either no protection or are protected by a second protection structure that is different than the first protection structure.

Figure 1:
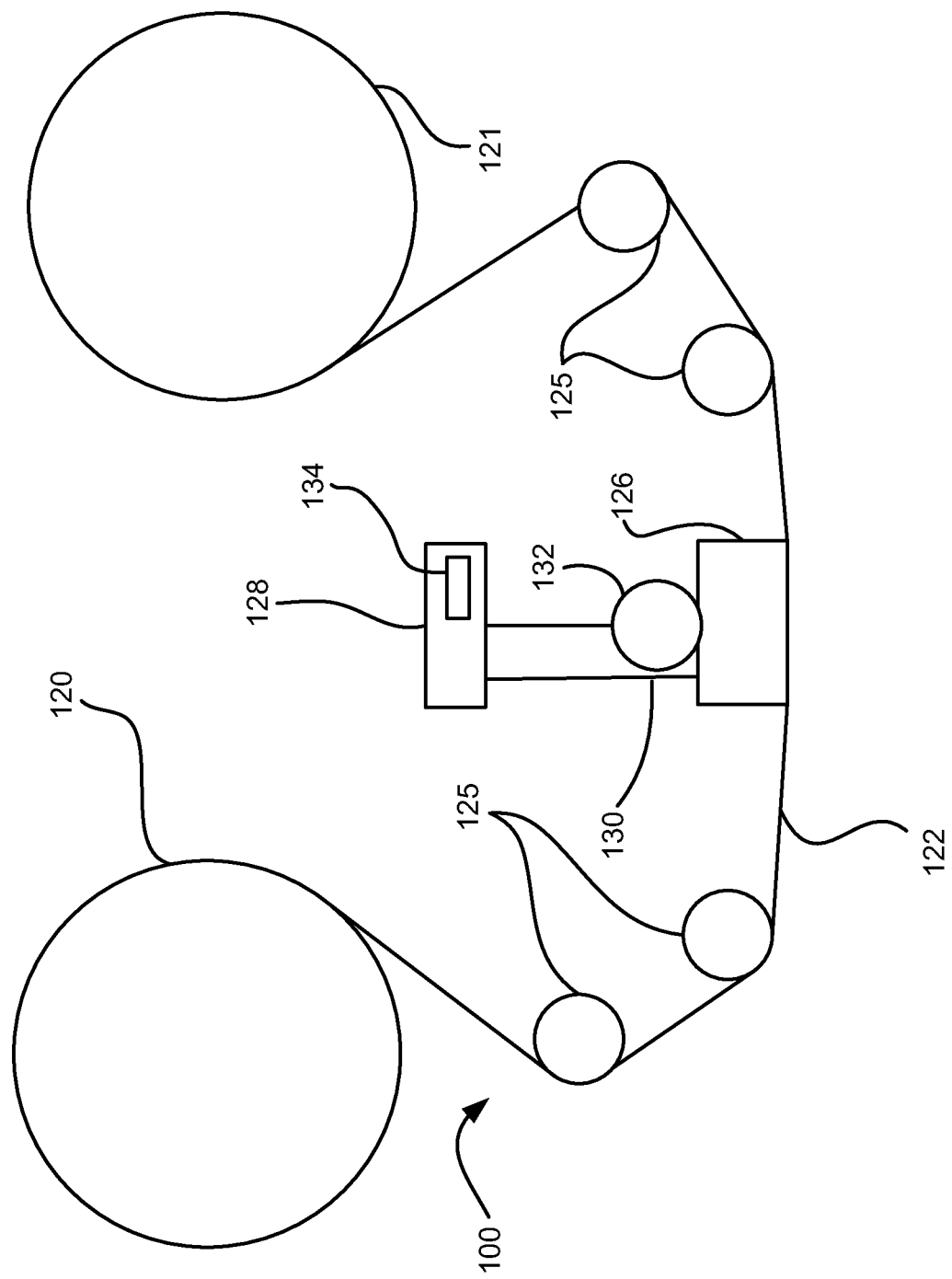
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller assembly 128 via a cable 130. The controller 128 typically controls head functions such as servo following, writing, reading, etc. The controller may operate under logic known in the art, as well as any logic disclosed herein. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
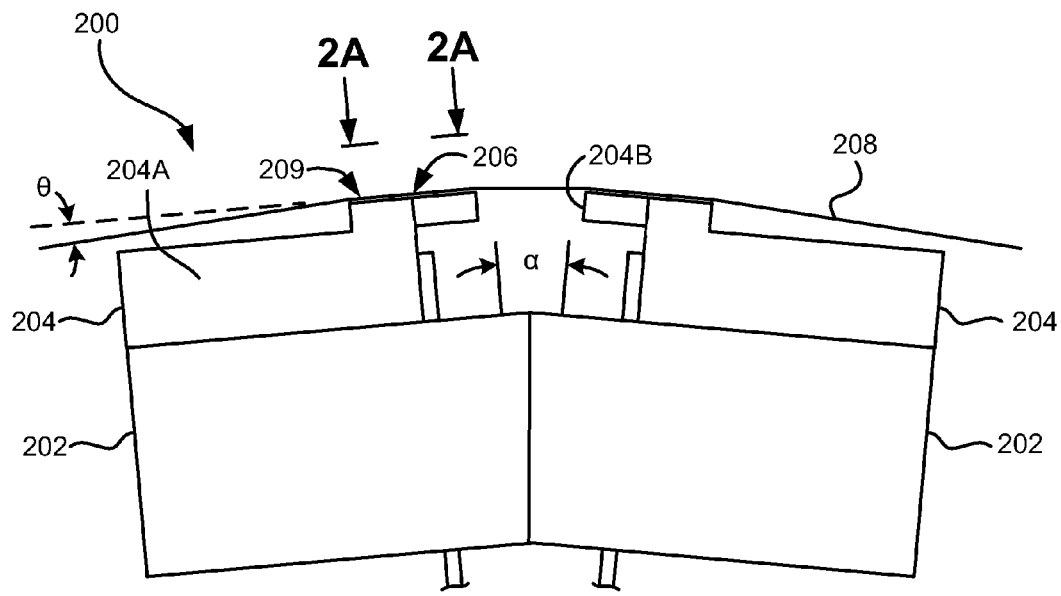
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo track readers for reading servo data on the medium.

Figure 2A:
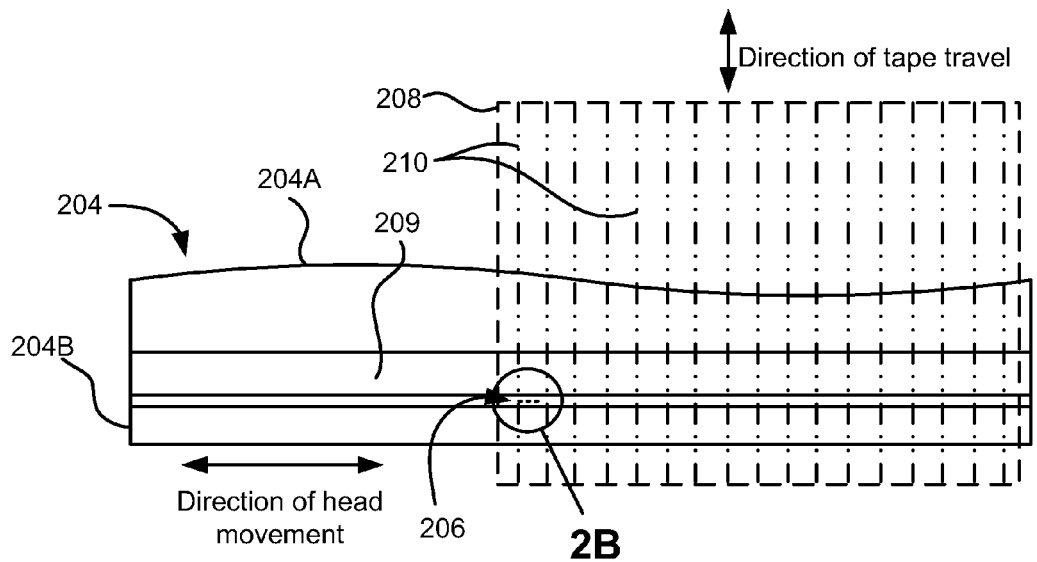
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 512 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
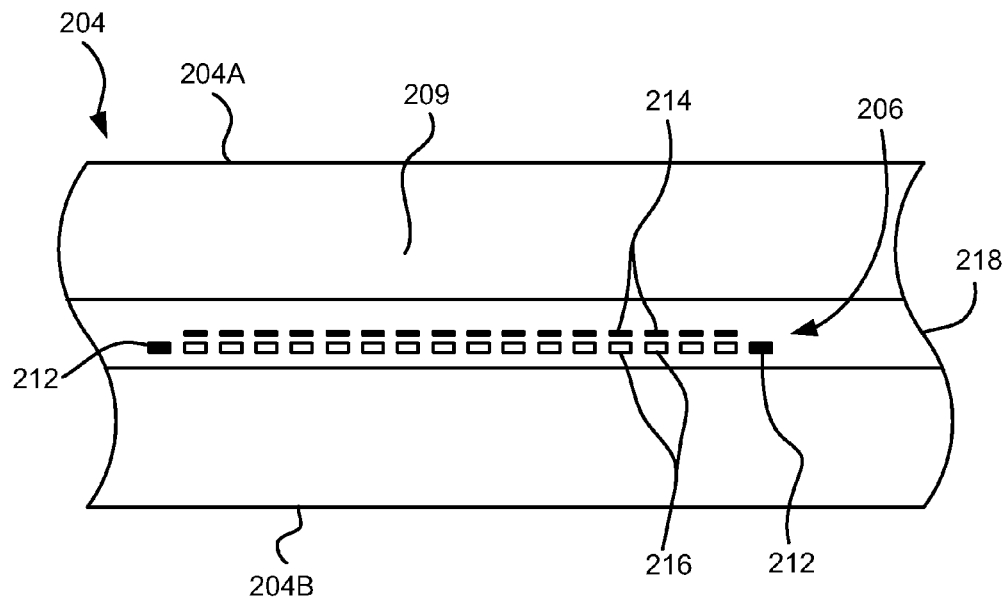
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. A preferred embodiment includes 32 readers per array and/or 32 writers per array, where the actual number of transducing elements could be greater, e.g., 33, 34, etc. This allows the tape to travel more slowly, thereby reducing speed-induced tracking and mechanical difficulties, and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
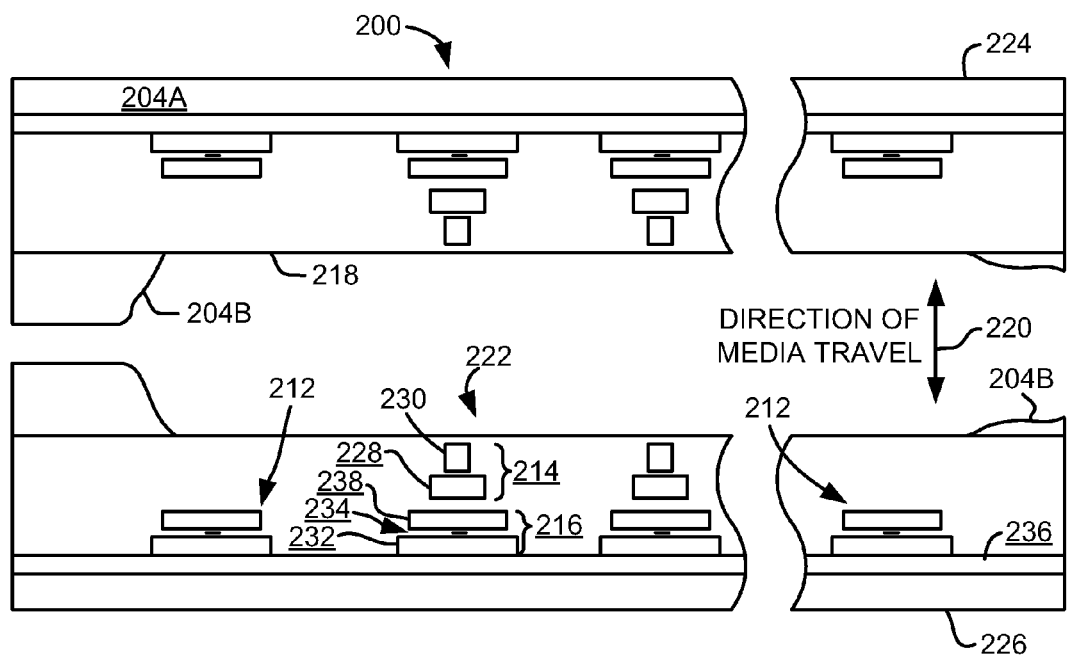
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
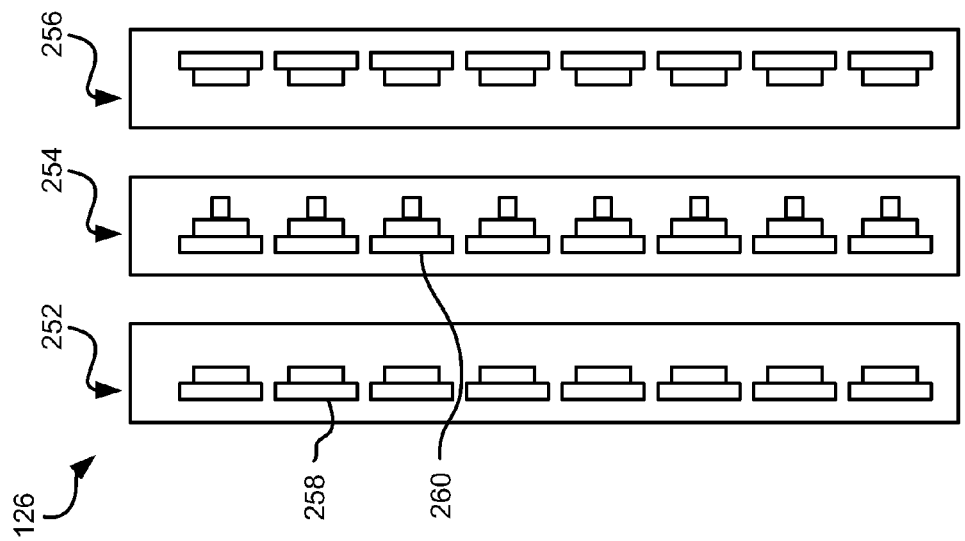
FIG. 4 is a partial tape bearing surface view of a magnetic head having a read-write-read configuration.
Figure 3:
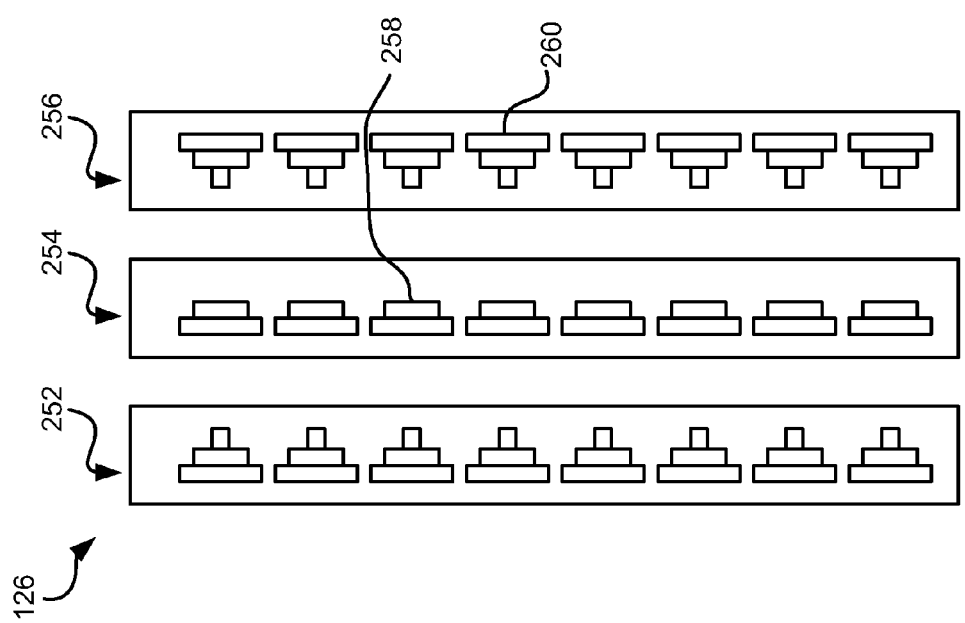
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
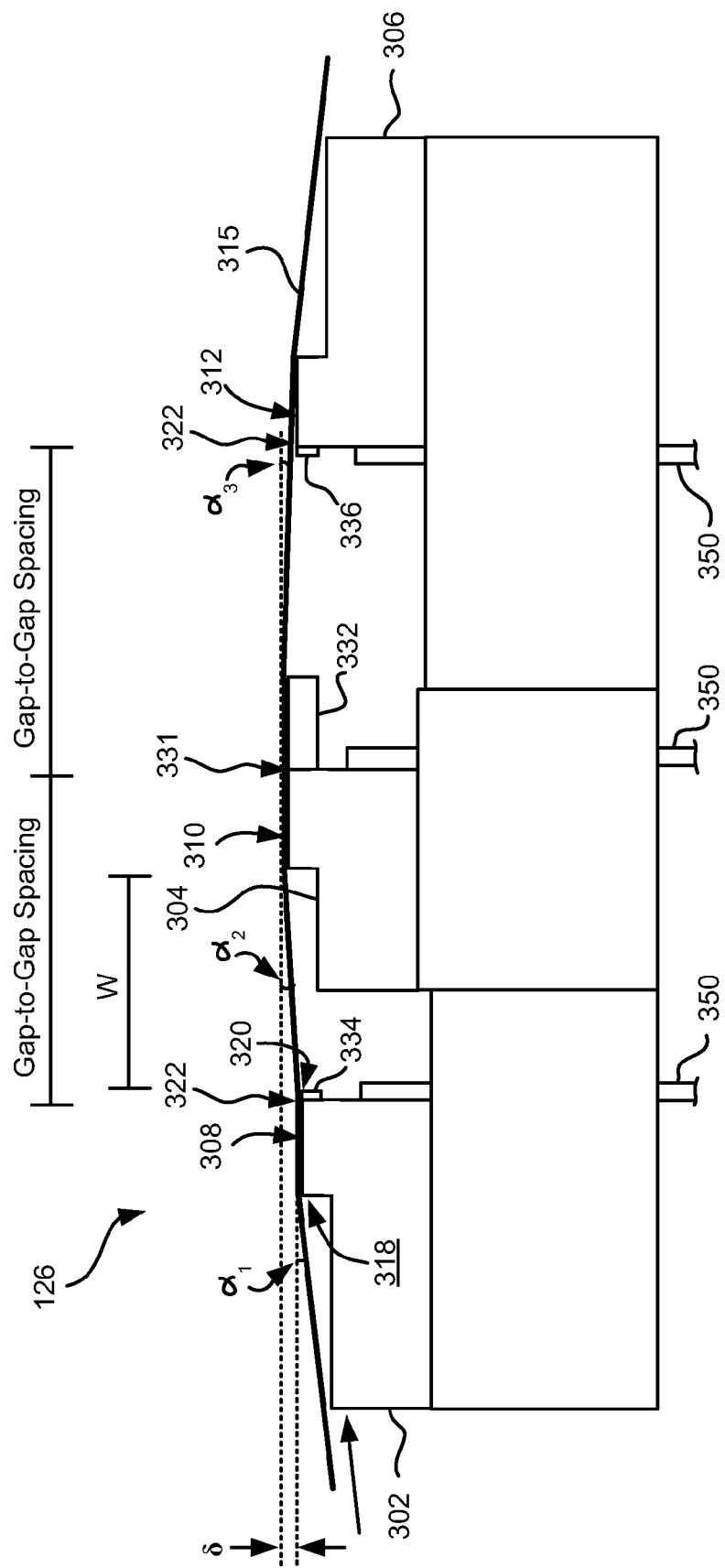
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
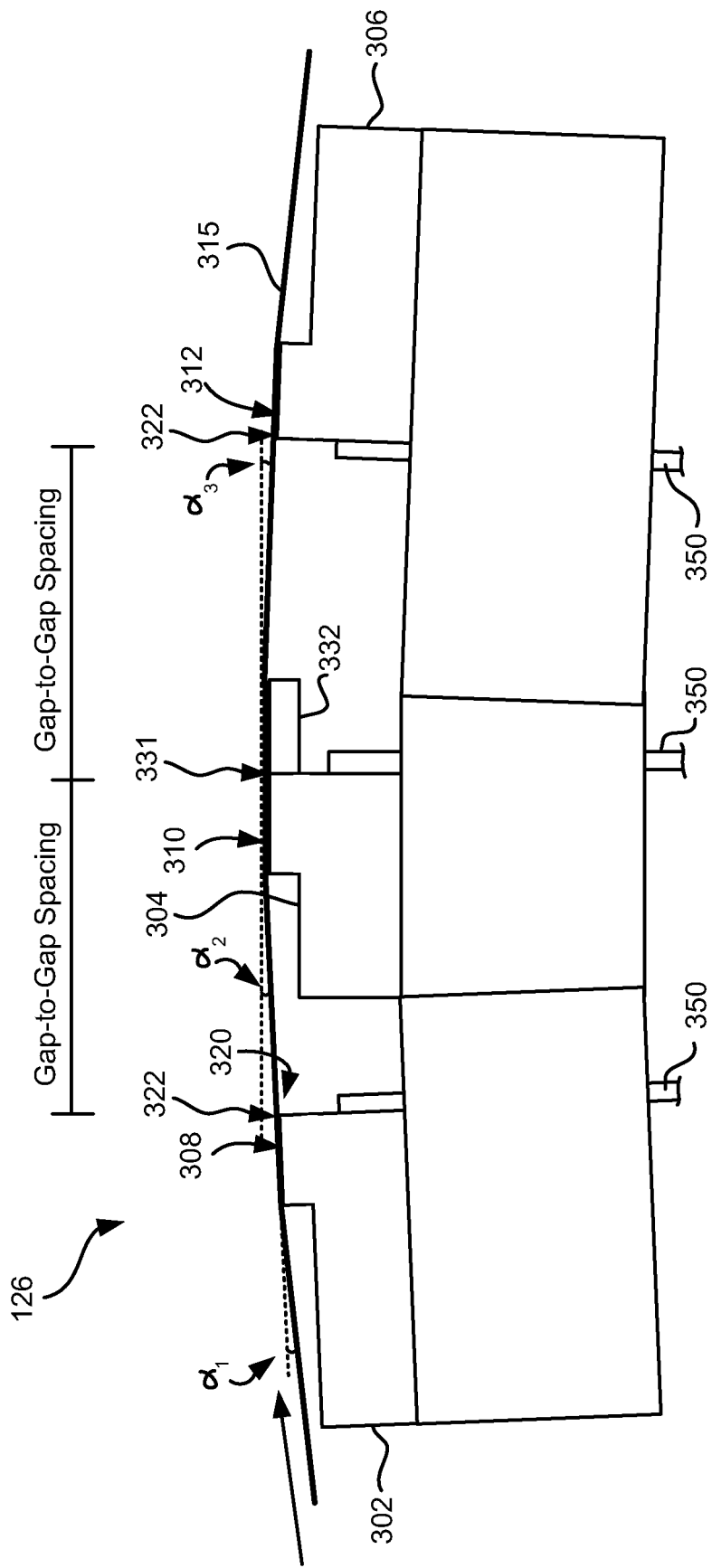
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
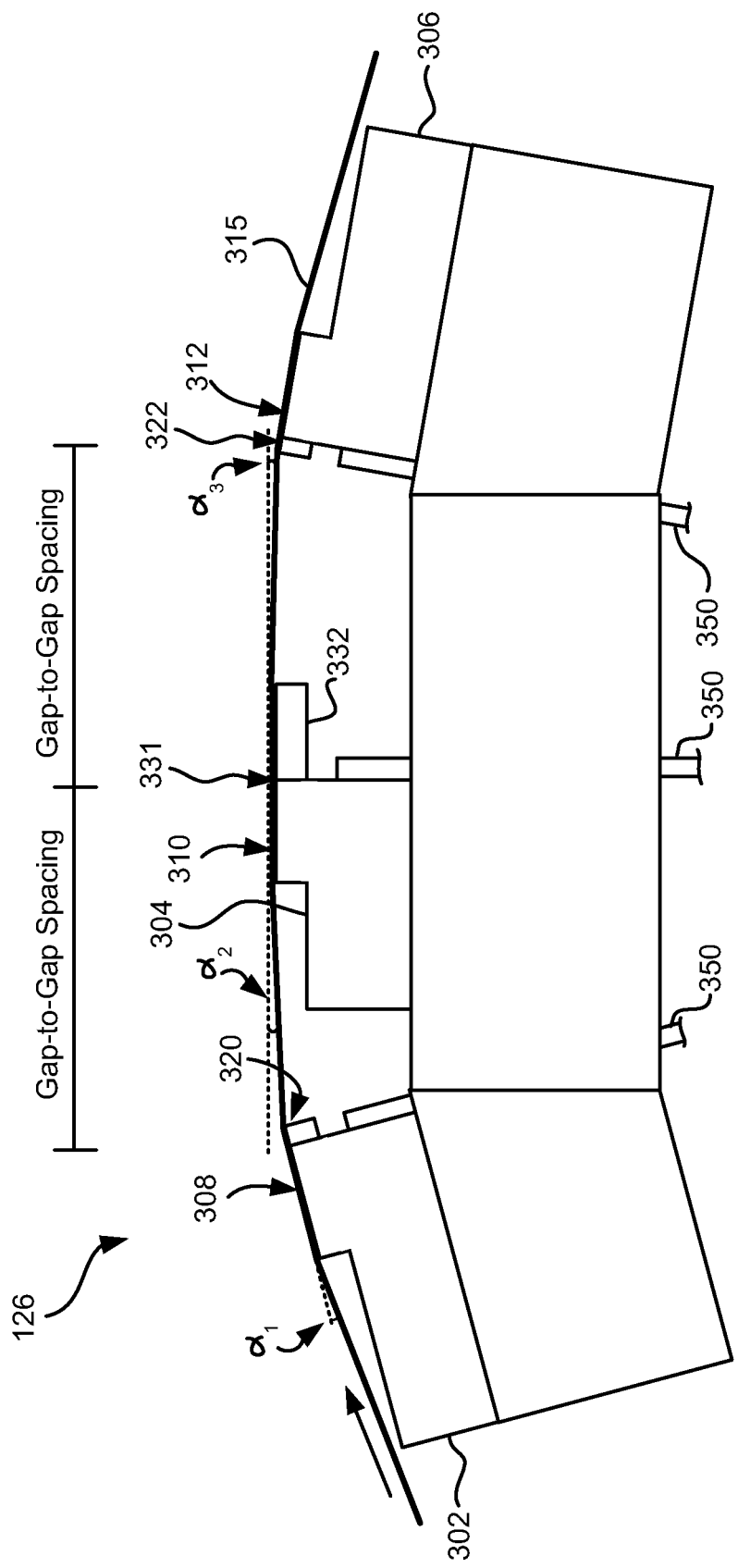
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

Although low, more preferably zero or near-zero recession is desirable for writers to minimize spacing losses, moderate recession is acceptable, and may even be desirable for readers in some cases. However, because recessing and/or coating modules produces a similar effect for all transducers in the module, there has previously been no way to provide substantially different recession values to different transducers. Thus, conventionally it has not been possible to provide the desired recession to both the writers and readers on a single module.

Therefore, it is desirable that different transducers and/or different transducer types are protected differently, such that the protection for one transducer does not affect the protection used for another transducer. Furthermore, it is desirable that a module may have both near-zero recession for the writers as well as moderately recessed and/or protected readers. As will be seen, the embodiments described and/or suggested herein are not limited in scope only to addressing the need for zero recession writers and protected readers.

Figure 8:
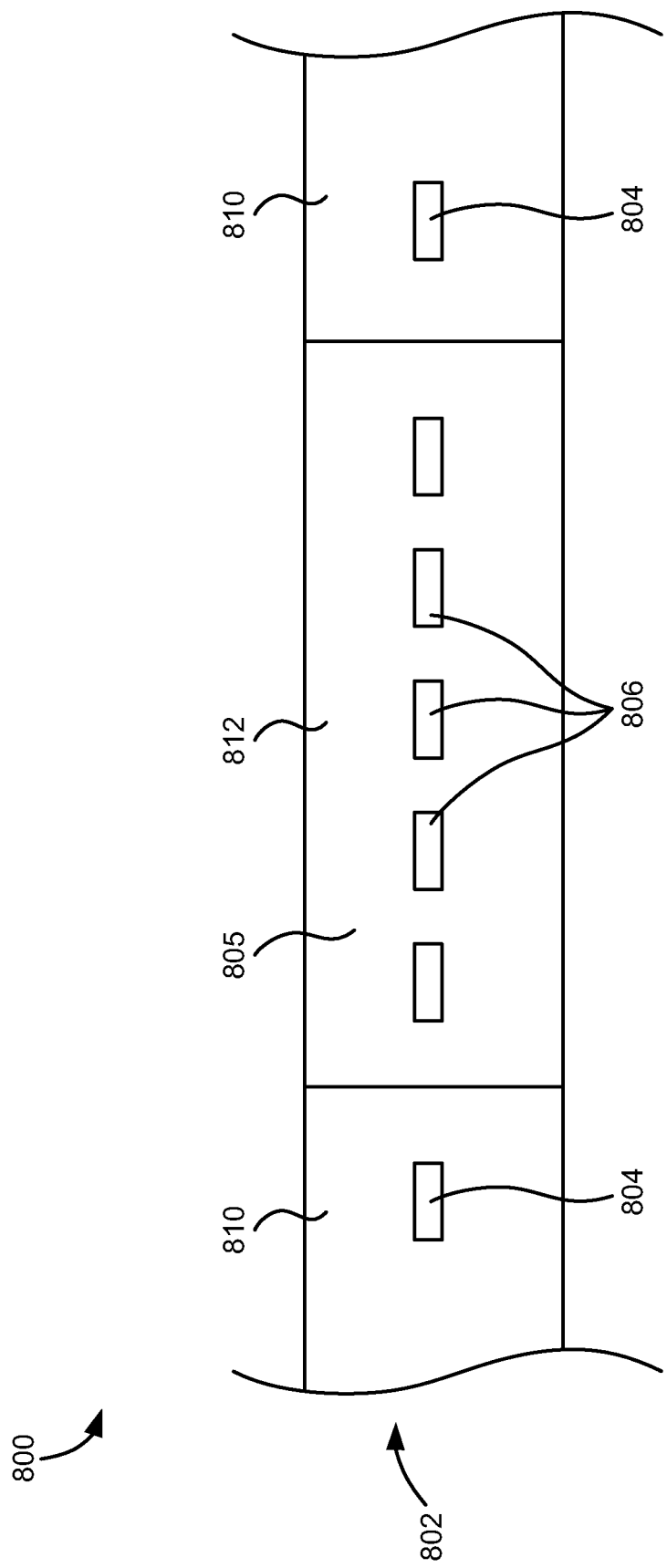
FIG. 8 is a partial top-down view of a magnetic head according to one embodiment.

Referring to FIG. 8, in one illustrative embodiment, a magnetic head 800 may include a module 802. According to one approach, the magnetic head may include a second and/or third module having a configuration different than, similar to or identical to the module 802. For example, the magnetic head 800 may similar to any of those described above.

In one approach, the magnetic head may be configured to operate with tape media. In another approach, the magnetic head may include a slider for use e.g., with a magnetic disk.

The module 802 may also have first 804 and second 806 transducers of different transducer types. The different transducer types may be selected from a group including data reader transducers, servo reader transducers, write transducers, piggyback read-write transducers, merged read-write transducers, etc. According to various approaches, the first and/or second transducers may include one, more than one, at least two, several, etc. transducers or combinations thereof.

The first 804 and second 806 transducers may further be positioned towards a media facing side 805 of the module 802. In one approach, at least one of the first and the second transducers may be present in an array extending along the media facing side of the module. In one approach, the media facing side may be a common media facing side.

The magnetic head 800 additionally includes a first protection structure 810 for protecting the first transducer 804.

Moreover, in an optional embodiment as depicted, the second transducer 806 may be protected by a second protection structure 812 which may preferably be different than the first protection structure 810. In another approach, the first protection structure 810 may be present and the second transducer 806 may have no protection, e.g., as where servo readers are protected but data writer transducers are not. In a further approach, the second protection structure 812 may be present but the first transducer 804 is unprotected.

The various possible protection structures may each be of one type and/or have a combination of features. In a preferred approach, a protection structure may implement a coating to protect the transducers from wear induced by the magnetic medium.

In one approach, the first and/or second protection structure may include a coating on the media facing side of the module adjacent the associated transducer. According to one approach, the coating may have any shape, orientation, etc. depending on the desired embodiment. For example, the coating may overlie the associated transducer, e.g., as a full film, etc.; may surround the transducer, e.g., in a donut shape; may be present in a strip or a stripe in front of, on top of, and/or behind the associated transducer in the direction of media travel thereacross; may sandwich the associated transducer laterally; etc. and combinations thereof.

In another approach, the first and/or second protection structure may include a recessed portion of the media facing side adjacent the associated transducer. In one approach, the first and/or second protection structure may additionally include a coating on the recessed portion of the media facing side adjacent the associated transducer.

FIGS. 9A-9B depict a module 900, in accordance with one embodiment. As an option, the present module 900 may be implemented in conjunction with features from any other embodiment listed herein, such as those described with reference to the other FIGS. Of course, however, such module 900 and others presented herein may be used in various applications and/or in permutations which may or may not be specifically described in the illustrative embodiments listed herein. Further, the module 900 presented herein may be used in any desired environment.

FIGS. 9A-9B depict a top-down and cross-sectional view, respectively, of a module 900 in accordance with one embodiment. As an option, the present module 900 may be implemented in conjunction with features from any other embodiment listed herein, such as those described with reference to the other FIGS. Of course, however, such module 900 and others presented herein may be used in various applications and/or in permutations which may or may not be specifically described in the illustrative embodiments listed herein. Further, the module 900 presented herein may be used in any desired environment.

Referring to one embodiment as depicted in FIGS. 9A-9B, first and second transducers 902, 904 are positioned on the media facing side 906 of the module 900. The module 900 may, as an option, also include a closure 910 and a substrate 912.

The first protection structure includes a recess of depth $d_1$ from a plane of a media facing side 906 and a coating 908 which may protect the first transducers 902.

Figure 10:
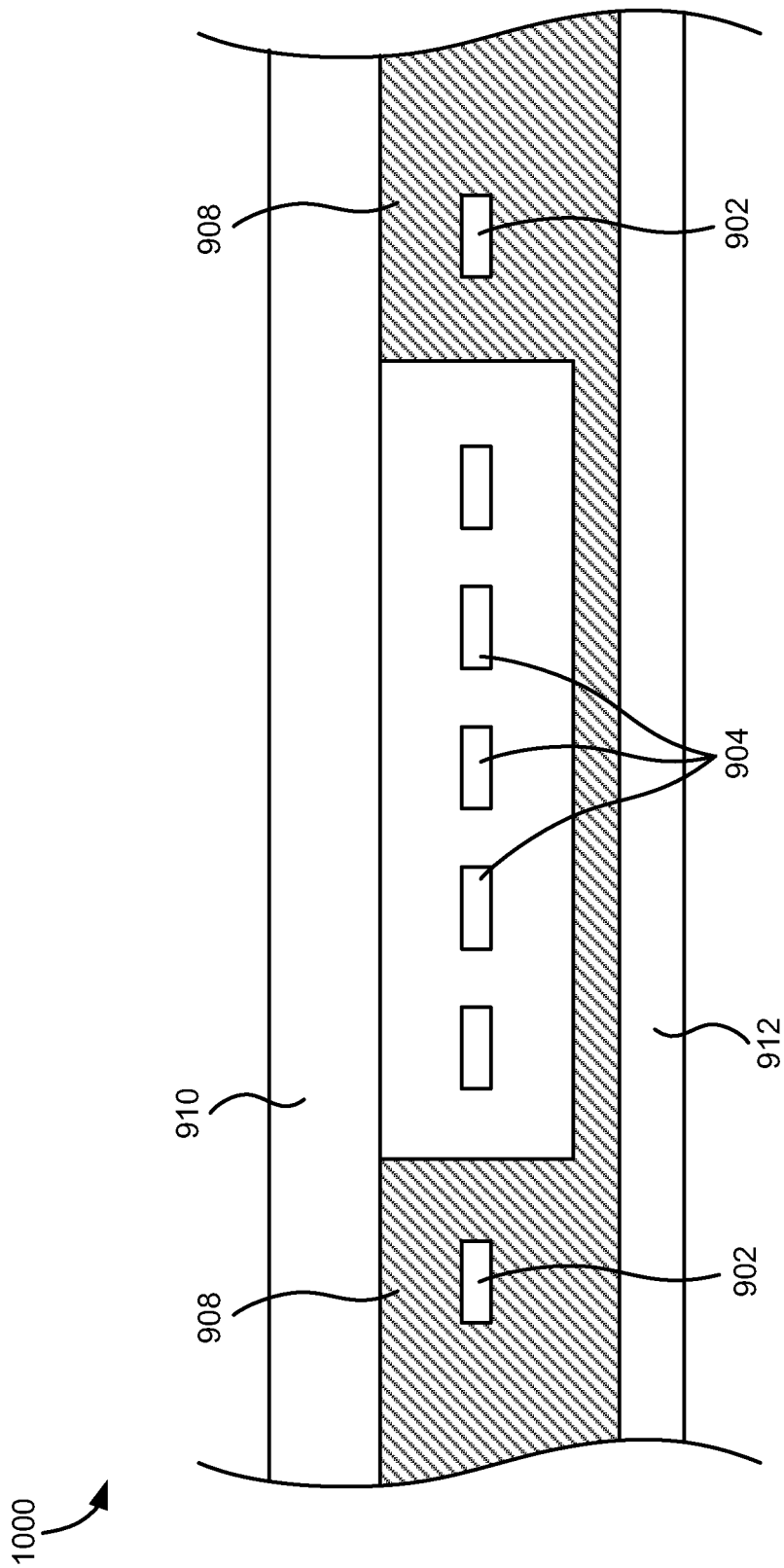
FIG. 10 is a partial top-down view of a module according to one embodiment.

FIG. 10 depicts a module 1000, in accordance with one embodiment. As an option, the present module 1000 may be implemented in conjunction with features from any other embodiment listed herein, such as those described with reference to the other FIGS. Of course, however, such module 1000 and others presented herein may be used in various applications and/or in permutations which may or may not be specifically described in the illustrative embodiments listed herein. Further, the module 1000 presented herein may be used in any desired environment.

According to an alternate embodiment as depicted in FIG. 10, a recess may be present in a region of the first transducer 902, and extend along a region of the second transducer 904. A coating 908 may be positioned in the recess. Also or alternatively, the coating 908 may extend over portions of the closure 910 and/or substrate of the module 1000.

FIGS. 11A-11B depict a module 1100, in accordance with one embodiment. As an option, the present module 1100 may be implemented in conjunction with features from any other embodiment listed herein, such as those described with reference to the other FIGS. Of course, however, such module 1100 and others presented herein may be used in various applications and/or in permutations which may or may not be specifically described in the illustrative embodiments listed herein. Further, the module 1100 presented herein may be used in any desired environment.

In yet another alternate embodiment, a module 1100, as depicted in the top-down and cross-sectional views of FIGS. 11A-11B respectfully, incorporates a second protection structure. In one approach, the second protection structure may include a coating 1102 on the media facing side that is adjacent the second transducer as shown. According to one approach, the coating for the second protection structure may preferably be on a different portion of the media facing side than the coating for the first protection structure.

Moreover, the second protection structure may include a recessed portion of the media facing side adjacent the second transducer. In a preferred approach, the extent of recession for the portion of the media facing side adjacent the second transducer may be less than the extent of recession for the portion of the media facing side adjacent the first transducer.

In various approaches, portions of a module that are protected by a protection structure may be intentionally recessed relative to other portions of the module that are differently protected, or non-protected. This may provide increased contact pressure between the magnetic medium and the differently protected or non-protected portions thereby reducing the transducer-to-medium spacing. According to various embodiments, it may be favorable to have a minimal transducer-to-medium spacing to maximize the accuracy of the transducers. According to one illustrative example, it may be preferable for writers to be non-protected to minimize the transducer-to-medium spacing of the writers, thereby optimizing the accuracy of the writers, for example by sharpening the written transitions.

In other approaches, the first and/or second protection structures may themselves be segmented and include more than one type of protection.

According to another illustrative embodiment, a data storage system may include a magnetic head according to any of the approaches described and/or suggested herein. The data storage system may additionally include a drive mechanism for passing a magnetic medium over the magnetic head.

Furthermore, the data storage system may include a controller electrically coupled to the magnetic head. According to various approaches, the controller may be electrically coupled to the magnetic head via a wire, a cable, wirelessly, etc.

According to one embodiment, a method for forming a head according to any of the approaches described and/or suggested here may include applying a coating to the media facing side of the module, which may form at least a portion of the first protection structure.

The method may further include applying a coating to the recessed portion of the media facing side of the module, which may form at least another portion of the first protection structure.

Furthermore, the method may include recessing a portion of the media facing side of the module adjacent the first transducer, which may form the first protection structure.

According to various approaches, a recessed portion of the media facing side of the module may be formed by masking, etching, etc. or any other process which would be apparent to one skilled in the art upon reading the present description.

It will be clear that the various features of the foregoing methodologies may be combined in any way, creating a plurality of combinations from the descriptions presented above.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
applying a first coating to a media facing side of a module, the module having an array of transducers extending along a media facing side of the module, the array of transducers including at least one first transducer and several second transducers, the first and second transducers being of different magnetic transducer types positioned towards the media facing side of the module, wherein the different transducer types are selected from a group consisting of data reader transducers, servo reader transducers, write transducers, piggyback read-write transducers and merged read-write transducers,
wherein the first coating forms at least a portion of a first protection structure for protecting the at least one first transducer,
wherein the first protection structure is on both sides of the at least one first transducer in a direction of tape travel thereacross,
wherein the second transducers have either no protection or are protected by a second protection structure that is different than the first protection structure.

2. The method as recited in claim 1, wherein the first protection structure includes a coating on the media facing side of the module adjacent the at least one first transducer.

3. The method as recited in claim 2, comprising:
applying a second coating to the media facing side of the module, wherein the second coating forms at least a portion of the second protection structure for protecting the second transducers, wherein the second protection structure is on another portion of the media facing side that is adjacent the second transducers.

4. The method as recited in claim 3, wherein the second transducers are only protected by the second protection structure, wherein the at least one first transducer is only protected by the first protection structure.

5. The method as recited in claim 3, wherein the second protection structure is on both sides of the second transducers in a direction of tape travel thereacross.

6. The method as recited in claim 1, wherein the first protection structure is a recessed portion of the media facing side adjacent the at least one first transducer.

7. The method as recited in claim 6, wherein the first protection structure includes a coating on the recessed portion of the media facing side adjacent the at least one first transducer.

8. The method as recited in claim 6, wherein the second protection structure is present and includes a coating on another portion of the media facing side that is adjacent the second transducers.

9. The method as recited in claim 1, wherein the first protection structure includes a recessed portion of the media facing side adjacent the at least one first transducer, wherein the second protection structure is present and includes a recessed portion of the media facing side adjacent the second transducers, wherein an extent of recession of the recessed portion of the media facing side adjacent the second transducers is not as great as an extent of recession of the recessed portion of the media facing side adjacent the at least one first transducer.

10. The method as recited in claim 1, wherein the first and second transducers in the array are aligned along a straight line, the at least one first transducer flanking the second transducers in the array.

11. The method as recited in claim 1, wherein the module is part of a magnetic head, wherein the magnetic head also includes a second module having a configuration similar or identical to the module, the magnetic head being configured to operate with tape media.

12. The method as recited in claim 1, wherein the module is part of a magnetic head, wherein the magnetic head also includes a slider.

13. The method as recited in claim 1, wherein the first protection structure is also on both sides of the at least one first transducer in a direction perpendicular to the direction of tape travel thereacross.

14. A method, comprising:
applying a first coating to a media facing side of a module, the module having first and second transducers of different transducer types positioned towards a media facing side of the module, wherein the different transducer types are selected from a group consisting of data reader transducers, servo reader transducers, write transducers, piggyback read-write transducers and merged read-write transducers, wherein the first and second transducers are aligned with each other in a linear array, the first transducers flanking the second transducers;

wherein the first coating forms at least a portion of a first protection structure for protecting the first transducers; and applying a second coating to the media facing side of the module, wherein the second coating forms at least a portion of a second protection structure that is different than the first protection structure, the second protection structure being for protecting the second transducers;

wherein the first protection structure is on both sides of the first transducers in a direction of tape travel thereacross, wherein the second protection structure is on both sides of the second transducers in a direction of tape travel thereacross.

15. The method as recited in claim 14, wherein at least one of the first and the second transducers are present in an array extending along the media facing side of the module.

16. The method as recited in claim 15, wherein the first protection structure is also on both sides of the first transducer in a direction perpendicular to the direction of tape travel thereacross.

17. The method as recited in claim 16, wherein the first transducers are servo transducers.

18. The method as recited in claim 17, wherein the module is part of a magnetic head, wherein the magnetic head also includes a second module having a configuration similar or identical to the module, the magnetic head being configured to operate with tape media, wherein the magnetic head also includes a slider.

19. The method as recited in claim 14, wherein the second transducers are only protected by the second protection structure, wherein the first transducers are only protected by the first protection structure.

* * * * *